United States Patent
Uesugi et al.

(10) Patent No.: US 7,981,351 B2
(45) Date of Patent: Jul. 19, 2011

(54) CRYSTALLIZATION METHOD OF NECK OF PRIMARY MOLDED PRODUCT FOR BIAXIALLY-ORIENTED BLOW-MOLDED BOTTLE-SHAPED CONTAINER AND JIG TO BE USED FOR THE SAME

(75) Inventors: Daisuke Uesugi, Matsudo (JP); Yoshihiro Iimura, Matsudo (JP); Tadao Hirasawatsu, Kuto-Ku (JP); Yukio Kawahara, Koto-Ku (JP)

(73) Assignee: Yoshino Kogyosho Co., Ltd., Tokyo (JP)

( * ) Notice: Subject to any disclaimer, the term of this patent is extended or adjusted under 35 U.S.C. 154(b) by 0 days.

(21) Appl. No.: 12/453,343

(22) Filed: May 7, 2009

(65) Prior Publication Data
US 2009/0261506 A1  Oct. 22, 2009

Related U.S. Application Data
(63) Continuation of application No. 10/524,844, filed as application No. PCT/JP03/10521 on Aug. 20, 2003, now abandoned.

(30) Foreign Application Priority Data
Aug. 20, 2002  (JP) .................................. 2002-238960

(51) Int. Cl.
B29C 71/02 (2006.01)

(52) U.S. Cl. ....................................................... 264/346
(58) Field of Classification Search .................. 264/322, 264/346
See application file for complete search history.

(56) References Cited

U.S. PATENT DOCUMENTS
| | | | | |
|---|---|---|---|---|
| 4,386,046 A | * | 5/1983 | Yoshino et al. | 264/296 |
| 4,590,021 A | * | 5/1986 | Ota et al. | 264/457 |
| 6,217,818 B1 | * | 4/2001 | Collette et al. | 264/513 |

FOREIGN PATENT DOCUMENTS
| | | |
|---|---|---|
| JP | A-62-284724 | 12/1987 |
| JP | A-11-170354 | 6/1999 |
| JP | A-2002-145238 | 5/2002 |

* cited by examiner

Primary Examiner — Yogendra N Gupta
Assistant Examiner — Robert J Grun
(74) Attorney, Agent, or Firm — Oliff & Berridge, PLC

(57) ABSTRACT

A method for thermally crystallizing a neck of a primary molded product for forming a bottle-shaped container made of polyethylene terephthalate as principal ingredient, said neck having a functional part and a neck ring at a lower end thereof, said functional part being formed with screw threads at an upper portion thereof and a bead ring below the screw threads, said method comprising: heating the neck, and then squeezing the bead ring heated to the heat-deformable temperature, from outside so as to form an outer diameter of the bead ring within a dimensional tolerance for deformation with regard to sealing effect.

11 Claims, 5 Drawing Sheets

(a)

(b)

Outer diameter of the bead ring obtained by each jig

Outer diameter below the bead ring obtained by each jig

Ellipticity of the outer periphery of the bead ring

Ellipticity below the bead ring

CRYSTALLIZATION METHOD OF NECK OF PRIMARY MOLDED PRODUCT FOR BIAXIALLY-ORIENTED BLOW-MOLDED BOTTLE-SHAPED CONTAINER AND JIG TO BE USED FOR THE SAME

CROSS-REFERENCE TO RELATED APPLICATIONS

This is a Continuation of application Ser. No. 10/524,844 filed Feb. 17, 2005, which is a National Phase of Application No. PCT/JP03/010521 filed Aug. 20, 2003, which claims priority to JP 2002-238960 filed Aug. 20, 2002. The disclosures of the prior applications are hereby incorporated by reference herein in their entireties.

BACKGROUND OF THE INVENTION

This invention relates to a thermal crystallization method of a neck of a primary molded product of a bottle-shaped container having a single layer or a multilayer including a gas barrier material. The present invention also relates to a jig to be used for the thermal crystallization method of the neck.

Bottles formed by biaxially oriented blow-molding of polyethylene terephthalate resin (to be referred to as PET resin hereinafter) have been made to show a small wall thickness in recent years for the purpose of cost reduction. Bottles having a thin wall are then required to show an effective gas barrier property in order to prolong the shelf life of the beverage contained in the bottle.

This requirement is currently met by using a primary molded product (to be referred to as "preform" hereinafter) having a multilayer structure of PET resin/gas barrier material/PET resin for molding a bottle, or by forming a primary molded product by injection molding of PET resin blended with a gas barrier material such as nylon (MXD-6) so as to provide the bottle, which is the secondary molded product formed from the preform by biaxially-oriented blow molding, with a gas barrier effect.

The preform (primary molded product) is formed by firstly injecting PET resin into a cavity through the nozzle of an injection machine whose injection pressure has been regulated to a predetermined level, then injecting a gas barrier material through the nozzle into the PET resin in the cavity, and subsequently injecting PET resin in the cavity under injection pressure that is also regulated to a predetermined level, in order to realize a multilayer structure.

The fluidity of the PET resin and the gas barrier material in the cavity can change as a function of a variety of factors including the temperature of the injection machine, the injection pressure, the injection rate, the difference of viscosity between the resin and the gas barrier material, the moisture content of the resin and the temperature of the manifold etc. Particularly, the fluidity is affected remarkably by temperature. Even if the temperature of the injection machine is defined rigorously, it is difficult to accurately control the temperatures of the resin and the gas barrier material in the injection machine. Thus, when molding the perform, part of the leading edge of the flowing gas barrier material is displaced toward the free end of the neck from the defined position on the circular periphery of the neck, while the remaining leading edge is displaced toward the body, because of a delicate change in the fluidity that is caused by fluctuations of various parameters including the injection pressure, the injection rate and temperature.

The neck of the preform produced by injection molding is a part that is not oriented during the secondary molding operation of biaxially-oriented blow-molding, so that it becomes thicker than the remaining parts of the bottle after the biaxially-oriented blow-molding. Therefore, that neck possesses a satisfactory gas barrier property, and hence it is not necessary to provide the neck with a gas barrier material layer.

For a bottle formed by biaxially-oriented blow-molding to show a satisfactory bas barrier effect, it is necessary that a gas barrier material layer is found at least in the shoulder and the body of the molded bottle. Therefore, a preform is prepared by placing the leading edge of the gas barrier material layer at the neck ring position of the neck when molding the preform. In other words, the preform is formed such that the gas barrier material is positioned at and below the neck ring.

However, as pointed out above, it is difficult to accurately control the position of the leading edge of the gas barrier material layer at the time of injection molding. Therefore, if the leading edge is defined to be positioned at the neck ring for the molding operation, the leading edge can be partially positioned at the bead ring that operates as functional part of the neck on the circular periphery of the neck. In other words, the leading edge can be positioned above the neck ring.

When a bottle formed by biaxially oriented blow-molding is used as heat-resistant bottle, it is necessary to whiten (thermally crystallize) the neck that is not drawn during the biaxially oriented blow-molding operation. When a preform having a multilayer structure of a PET resin layer and a gas barrier material layer is processed for thermal crystallization, the gas barrier material layer and the PET resin layer existing in the neck show respective coefficients of contraction that are different from each other due to the difference in the degree of crystallization, so that they do not contract exactly to the defined extent. Thus, there arises a problem that the neck is formed to show a diameter greater than the defined value.

As described above, the leading edge of the gas barrier material layer cannot be rigorously controlled for its position.

If the leading edge is tilted or incorrectly positioned on the circular periphery of the injection-molded neck, the neck is apt to be deformed to show an elliptic profile due to the difference in the coefficient of contraction caused by the difference in the degree of crystallization between the gas barrier material layer and the PET resin layer.

Particularly, if the functional part of the neck is not molded to the defined dimensions, problems such as a poor sealing effect and a poor screwing performance of the cap can arise. Additionally, even in the case of a bottle having a single layer of polyethylene terephthalate, there can arise an occasion where the neck does not show its proper profile due to the fluidity of resin during the injection molding process. In this case, the neck that is required to correctly show a circular profile may show an elliptic profile.

This invention is intended to dissolve the above identified problems of the prior art. It is the object of the present invention to provide a thermal crystallization method of the neck of the primary molded product of a biaxially-oriented blow-molded bottle having a single layer or a multilayer including a gas barrier material layer for improving the gas barrier effect of the bottle that is to be formed, wherein after the completion of the heating step, the bead ring is squeezed in the thermal crystallization process, to prevent the functional part of the neck from deforming, in order to make the functional part of the crystallized neck reliably show a satisfactory sealing effect. Another object of the present invention is to provide a jig to be used for the thermal crystallization method of the neck of the primary product.

SUMMARY OF THE INVENTION

According to the invention, the above object is achieved by providing a method for thermally crystallizing a neck of a primary molded product for forming a bottle-shaped container made of polyethylene terephthalate as principal ingredient, said neck having a functional part and a neck ring at a lower end thereof, said functional part being formed with screw threads at an upper portion thereof and a bead ring below the screw threads, said method comprising:

heating the neck, and then squeezing the bead ring heated to the heat-deformable temperature, from outside so as to form an outer diameter of the bead ring within a dimensional tolerance for deformation with regard to sealing effect.

With the above described construction, the bead ring of the neck of the primary molded product formed by injection molding is squeezed after the completion of heating, to form an outer diameter of the bead ring within the dimensional tolerance for deformation with regard to sealing effect.

Additionally, the bead ring is also prevented from being elliptically deformed by squeezing. Thus, problems such as a poor screwing performance of the cap and a poor sealing effect can be dissolved.

Preferably, the primary molded product includes at least one resin layer (s) made of polyethylene terephthalate as principal ingredient and at least one gas barrier material layer (s), and has a multilayer structure.

With this construction, even if the leading edge of the gas barrier material layer is positioned above the neck ring at a part, the bead ring is prevent from deformation, and is formed within the dimensional tolerance for deformation with regard to sealing effect, by squeezing the bead ring.

Preferably, the bead ring is squeezed by 0.1 mm to 0.4 mm in terms of an outer diameter of the bead ring immediately after a completion of heating.

When the bead ring is squeezed by 0.1 mm to 0.4 mm in terms of the outer diameter immediately after the completion of heating, it is possible to form the outer diameter of the bead ring within the dimensional tolerance for deformation with regard to sealing effect, while maintaining the profile of the bead ring, which is held in a thermally deformable temperature.

Preferably, the bead ring is started to be squeezed at 10 seconds to 40 seconds after a completion of heating.

Immediately after the completion of heating, the neck maintains high temperature and is, therefore, apt to be thermally deformable, so that the dimensions of the bead ring can easily be reduced. However, if the bead ring is squeezed under such high temperature, the gas barrier material layer and the PET resin layer in the neck are crystallized too much after the completion of the squeezing, so that they are contracted or shrunk too much. Thus, it is difficult to form the bead ring within the dimensional tolerance for deformation with regard to sealing effect. Also, lopsided deformation between the bead ring and the neck ring would occur, so that the neck would be bent.

If the bead ring is started to be squeezed at 10 seconds to 40 seconds after a completion of heating, the bead ring has a temperature where the bead ring can be thermally deformed and suitably formed within the dimensional tolerance for deformation with regard to sealing effect.

Preferably, the bead ring is squeezed for 3-15 seconds.

If the bead ring is squeezed for 3-15 seconds, the squeezing operation can be arranged smoothly in the thermal crystallization process on the production line.

In another aspect of the invention, there is provided a jig to be used for a thermal crystallization method of a neck of a primary molded product for forming a bottle-shaped container made of polyethylene terephthalate, said neck being formed with screw threads at an upper portion thereof, a bead ring below the screw threads, and a neck ring at a lower end thereof, wherein said jig comprises a cylinder, and a piston rod in the cylinder, said cylinder has a reduced diameter section and a tapered section outwardly expanded at a lower end thereof, said reduced diameter section has a diameter smaller by 0.1 mm to 0.4 mm than an outer diameter of the bead ring having a thermally deformable temperature immediately after heating, and said piston rod abuts an upper end of the neck, to prevent the neck from being pulled up.

With the above described construction, it is possible to squeeze the bead ring from outside by means of the reduced inner diameter section having an inner diameter smaller by 0.1 mm to 0.4 mm than the outer diameter of the bead ring immediately after the completion of heating, so as not to change the external profile of the bead ring.

Since the cylinder is provided with a tapered section outwardly expanding toward an end thereof, it can be engaged with the neck having thermally deformable temperature without touching the primary molded product other than the bead ring with the end of the cylinder, so as not to consequently change the outer profile of the neck.

Additionally, since a piston rod is arranged in the cylinder, it is now possible to make the piston rod abut an end of the neck to prevent the primary molded from being pulled up with the cylinder.

The jig can be applied to the crystallization method in which the primary molded product has a multilayer structure including a gas barrier material layer in a resin layer made of polyethylene terephthalate as principal ingredient.

When the jig is used for such primary molded product as described above, by engaging the cylinder of the jig with the neck, it is possible to squeeze the bead ring from outside by means of the reduced inner diameter section having an inner diameter smaller by 0.1 mm to 0.4 mm than the outer diameter of the bead ring immediately after the completion of heating, while the bead ring is made to maintain its profile defined at the time of molding the preform so as not to change the external profile thereof.

DESCRIPTION OF THE PREFERRED EMBODIMENTS

Now, the present invention will be described by referring to the accompanying drawings that illustrate an embodiment of the invention.

Figure 1:
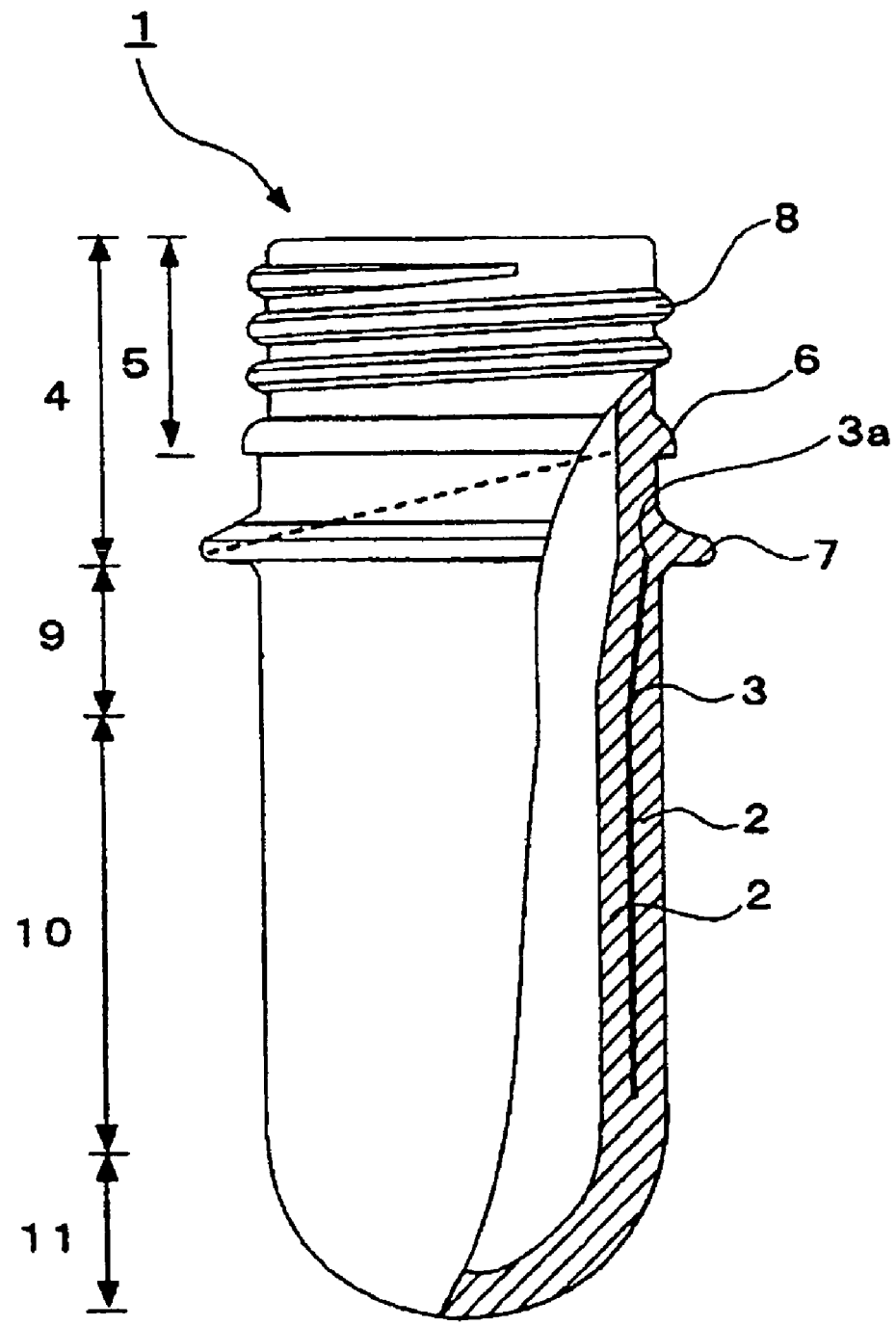
FIG. 1 is a schematic lateral view of a preform used in an example of the invention, illustrated partly in longitudinal cross section.

FIG. 1 is a side view of a preform 1 that is a primary molded product for a biaxially-oriented blow-molded container, illustrated partly in longitudinal cross section. The illustrated preform 1 has a multilayer structure of a PET resin layer 2, a gas barrier material layer 3, and a PET resin layer 2, although the present invention is not limited to such structure.

In the present invention, "PET" means resin containing polyethylene-terephthalate as principal ingredient, and may be blended with other material.

In this example, the gas barrier material layer is made of polyamide-containing m-xylylenediamine (MXD-6: tradename, available from Mitsubishi Gas Chemical Company Inc.) in view of a difference between the gas barrier material and the PET resin in terms of viscosity and crystallization rate as well as the gas barrier effect, although the present invention is not limited to this material.

As illustrated in FIG. 1, the preform 1 comprises a neck 4, a shoulder 9, a cylindrical body 10, and a bottom 11. The neck 4 has a functional part 5 at an upper portion thereof, and a neck ring 7 at a lower end thereof. The functional part 5 is formed with screw threads 8 on an outer surface of its upper portion. The functional part 5 is also formed with a bead ring 6 at a lower end thereof. The bead ring 6 is protruded outwardly.

The gas barrier material layer 3 has a leading edge 3a at an upper end thereof. The preform is formed such that the leading edge 3a is arranged or located at a center of the neck ring 7 in a longitudinal direction of the preform. In other word, "a defined position" of the leading edge 3a is the center of the neck ring 7 in the longitudinal direction of the preform.

The location of the leading edge 3a may vary depending on a temperature of an injection machine, an injection pressure, an injection rate, a difference of the viscosity between the PET resin and the gas barrier material, a moisture content of the PET resin, a temperature of a manifold, and other factors. It is difficult to accurately arrange the leading edge 3a at the defined position. For example, at a right end in the FIG. 1, the leading edge 3a may be incorrectly positioned above the defined position, as illustrated in a dotted line in FIG. 1.

If the leading edge 3a is incorrectly positioned and if such neck is heated for thermal crystallization, the shrink is insufficient for the desired dimension due to the difference of the shrink between the PET resin and the gas barrier material. The neck 4 tends to become larger than the desired dimension. Also, if the leading edge 3a is incorrectly positioned, a cross sectional shape of the neck 4 tends to become ellipse.

Figure 2:
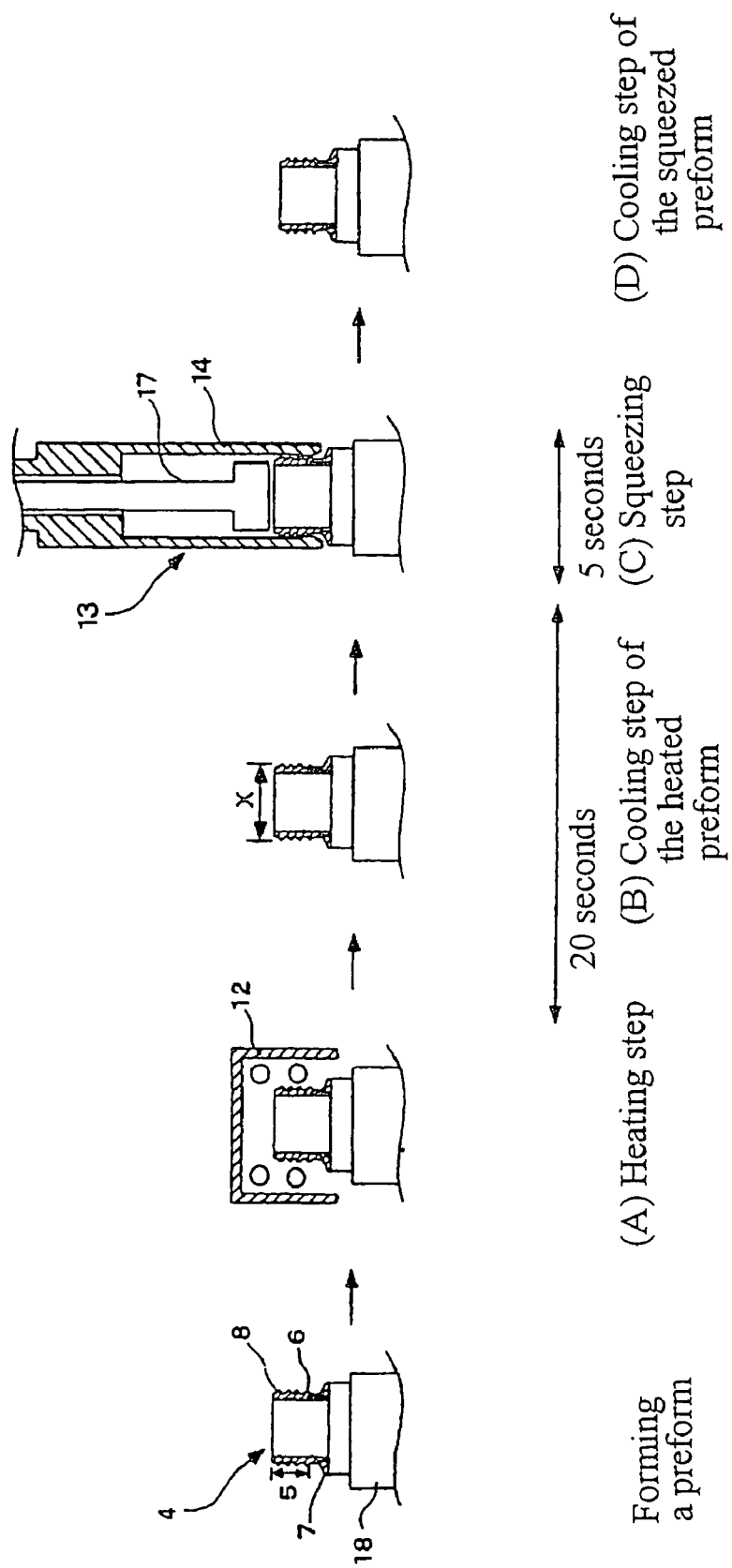
FIG. 2 is a schematic illustration of an example of the invention, showing steps of a thermal crystallization method of the primary molded product of a bottle to be formed by biaxially oriented blow molding.

Now, the method of thermally crystallizing the neck 4 of the preform 1 in order to provide the neck with thermal resistance will be described below. FIG. 2 is a schematic illustration of steps of the process of thermally crystallizing the neck 4.

As illustrated in FIG. 2, the process for thermally crystallizing the neck 4 of the preform 1 comprises (A) heating step, (B) cooling step of the heated preform, (C) squeezing step, and (D) cooling step of the squeezed preform. First, in the heating step (A), the neck 4 of the preform 1 supported to a support table 18 is arranged into a heating furnace 12, and heated to a predetermined temperature, to thermally crystallizing the neck 4. In the cooling step (B), the heated preform is taken out from the heating furnace 12, and gradually cooled at a room temperature, for 10-40 seconds, for example 20 seconds. In the squeezing step (C), a cylinder 14 of a jig 13 is engaged with the gradually cooled neck 4, and the bead ring 6 is squeezed for 3-15 seconds, for example 5 seconds. Finally, in the cooling step (D), the cylinder 14 is removed from the bead ring 6, and the preform 1 is gradually cooled for a predetermined period of time at room temperature to complete the thermal crystallization process.

Figure 3:
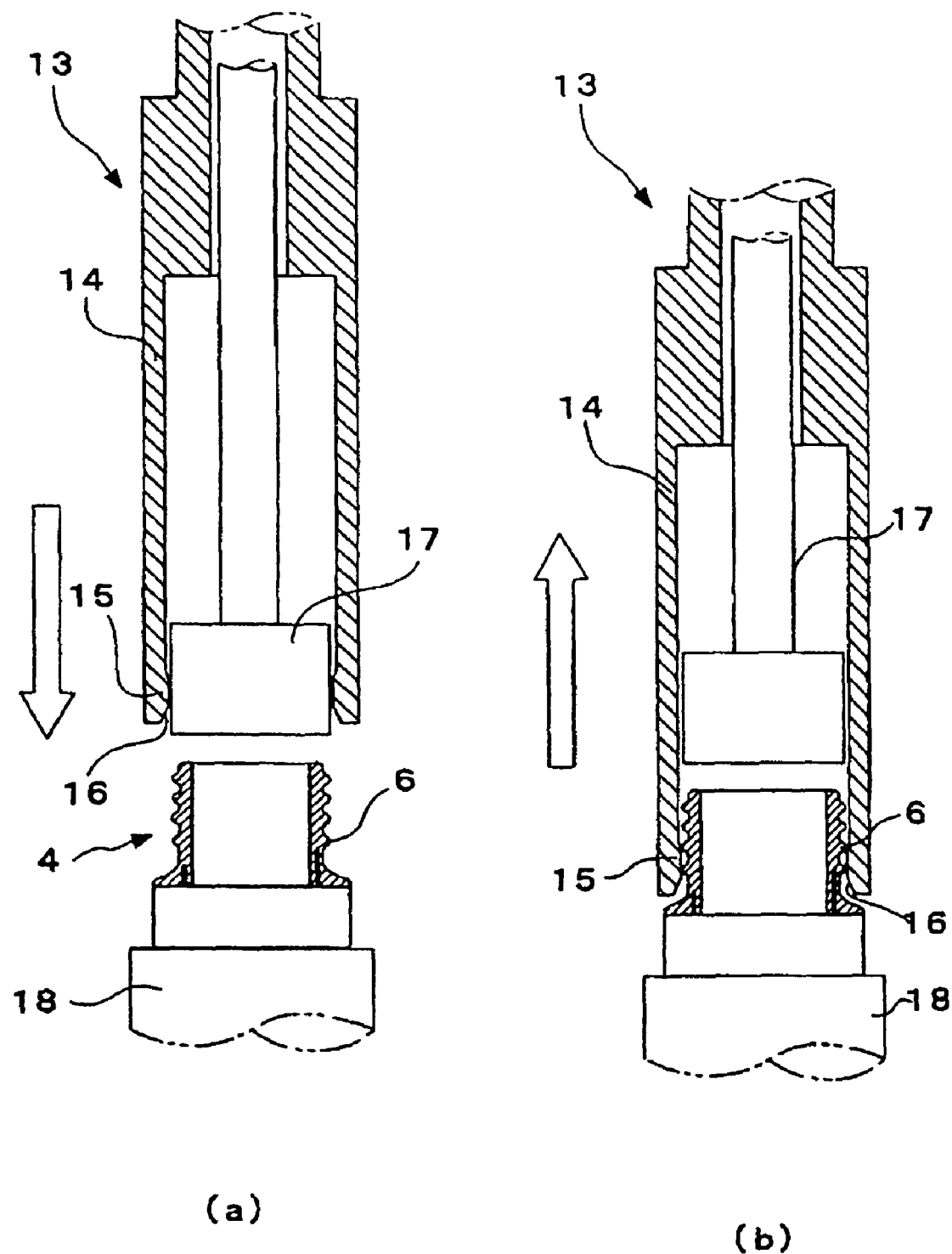
FIGS. 3A and 3B are schematic longitudinal sectional views of a jig according to the invention to be engaged with the primary molded product.

FIGS. 3A and 3B show an enlarged view of the jig 13 used for the above described thermal crystallization process. The jig 13 comprises the cylinder 14, and a piston rod 17 arranged in the cylinder 14. Also, the jig has a support table 18. The cylinder 14 is formed with a tapered section 16 at a lower end thereof. The cylinder 14 is formed with a reduced diameter section 15. An inner diameter at the reduced diameter section 15 is somewhat smaller than an outer diameter (x) of the bead ring 6 immediately after the completion of the heating step, and is (x−0.1) mm to (x−0.4) mm, for example, (x−0.2) mm, (x−0.3) mm or (x−0.4) mm.

In the squeezing step (C), the cylinder 14 is moved downwardly, so as to insert the bead ring 6 into the reduced diameter section 15. The bead ring 6 is squeezed by the reduced diameter section 15, so as to become the bead ring 6 within the dimensional tolerance for deformation with regard to sealing effect.

In the cooling step (D), the piston rod 17 is moved downwardly to abut an upper end of the neck 4, and the cylinder 14 is pulled up, while the preform 1 is held in position by the piston rod 17, so that it may not be pulled up with the cylinder 14.

Since the cylinder 14 is provided at the lower end thereof with the tapered section 16, the lower end of the cylinder 14 does not contact with the neck 4, so that the cylinder 14 can be smoothly engaged with and released from the neck 4.

As described above, the inner diameter at the reduced diameter section 15 is somewhat smaller than an outer diameter (x) of the bead ring 6 immediately after the completion of the heating step, and is (x−0.1) mm to (x−0.4) mm. If the inner diameter of the reduced diameter section 15 is larger than (x−0.1) mm (for example, (x−0.05) mm), the inner diameter of the reduced diameter section 15 does not show a significant difference from the outer diameter of the bead ring 6, so that the latter would not be squeezed satisfactorily. If, the inner diameter of the reduced diameter section 15 is smaller than (x−0.4) mm (for example, (x−0.5) mm), the reduced diameter section 15 would crush the bead ring 6 to deform the bead ring 6. Since the tapered section 16 is outwardly expanding toward the lower end of the cylinder 14, the threads 8 and the bead ring 6 do not contact with the lower end of the cylinder 14 to deform neither the threads 8 nor the bead ring 6, when the cylinder 14 is engaged with the neck 4 which is held in a thermally deformable state.

Although the neck 4 is gradually cooled in the step (B), the neck 4 with the bead ring 6 has a thermally deformable temperature in the step (C). Thus, in the step (C), the bead ring 6 can be formed within the dimensional tolerance for deformation with regard to sealing effect. Under such circumstances, the jig 13 is engaged with the neck 4, to insert the bead ring 6 into the reduced diameter section 15, so as to squeeze the bead ring 6, so that the bead ring 6 is formed within the dimensional tolerance for deformation with regard to sealing effect. After 10-40 seconds from the completion of the heat, the bead ring 6 can be squeezed without any problem.

In the step (C), the bead ring 6 is inserted into the reduced diameter section 15 for 3 to 15 seconds. If the bead ring 6 is inserted for less than 3 seconds, the bead ring 6 would not be effectively formed within the dimensional tolerance for deformation with regard to sealing effect. If the bead ring 6 is inserted for more than 15 seconds, production efficiency would be decreased.

The followings are the examples according to the present invention and the comparative example. Three jigs 13 were prepared. The bead ring 6 had a diameter X mm immediately after the heat. The first jig had the reduced diameter section 15 which diameter was (X−0.2) mm. The second jig had the reduced diameter section 15 which diameter was (X−0.3) mm. The third jig had the reduced diameter section 15 which diameter was (X−0.4) mm. In the above described step (C), each of the bead rings 6 was squeezed by each of the jigs 13. In the comparative example, the jig was not used. The heated preform was gradually cooled for 20 seconds in the step (B), and was squeezed for 5 seconds in the step (C).

Figure 4:
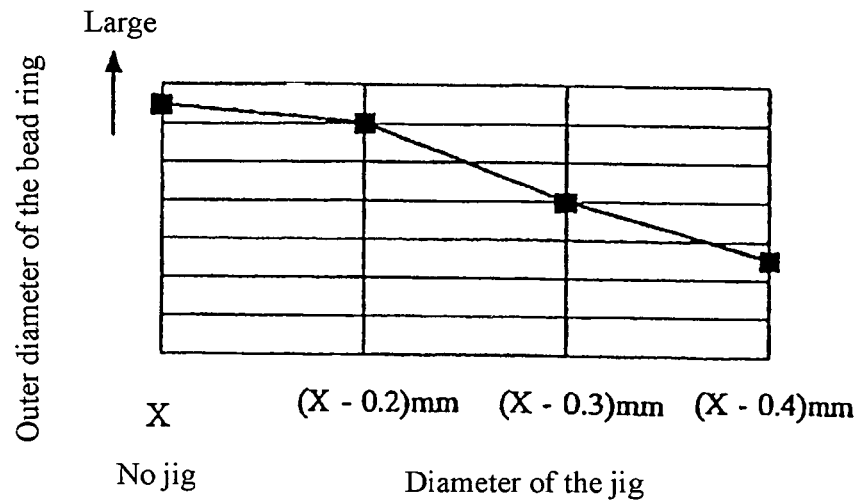
FIG. 4 is a graph illustrating the outer diameters of bead rings that are obtained when no jig is used, and when jigs having respective reduced inner diameter sections, whose inner diameters are different form each other, are used.

FIG. 4 shows each of the diameters of the thus obtained bead rings 6.

Figure 5:
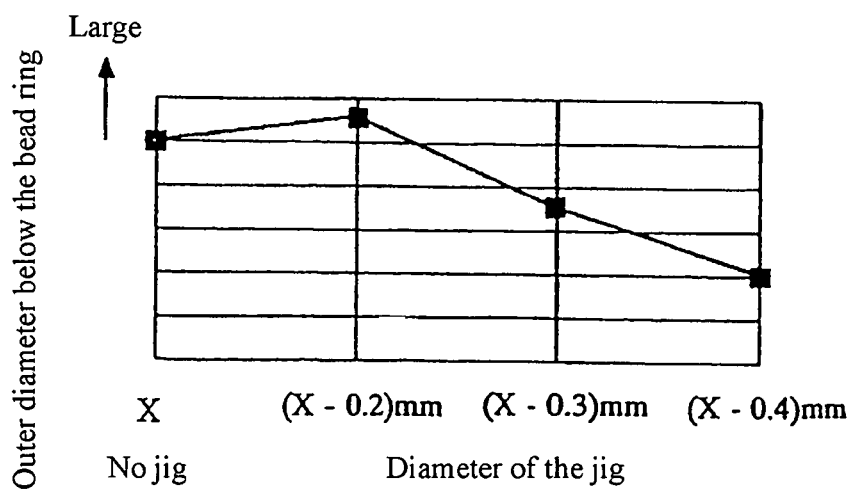
FIG. 5 is a graph illustrating the diameters below the bead rings that are obtained when no jig is used, and when jigs having respective reduced inner diameter sections, whose inner diameters are different form each other, are used.

FIG. 5 shows each of the diameters below the bead ring 6 (between the bead ring 6 and the neck ring 7).

When no jig 13 was used, the outer diameter of the bead ring 6 was larger than the desired dimension, as seen from FIG. 4.

The smaller the diameter of the reduced diameter section 15, the smaller the outer diameter of the squeezed bead ring 6, as illustrated in FIG. 4. As a result, the outer diameter of the bead ring 6 was reduced to come close to the desired dimension, so as to be formed within the dimensional tolerance for deformation with regard to sealing effect.

As seen from FIG. 5, when no jig 13 is used, the diameter below the bead ring 6 was larger than the desired dimension. When the diameter of the reduced diameter section 15 was small, the outer diameter below the squeezed bead ring 6 became small. As a result, the outer diameter below the bead ring 6 was reduced to come close to the desired dimension, so as to be formed within the dimensional tolerance for deformation with regard to sealing effect.

The dimension of each of the parts of the neck 4 other than the bead ring 6 was also observed. Relating to the neck ring 7, an outer diameter of the neck ring 7 in case of using each of the above described jigs 13 was substantially same as that of the neck ring 7 in case of non-use of the jig 13. Relating to threads 8, an outer diameter of the threads 8 in case of using each of the above described jigs 13 was somewhat larger than that of the threads 8 in case of non-use of the jig 13, although such threads did not affect the sealability and the engagement with a cap.

Figure 6:
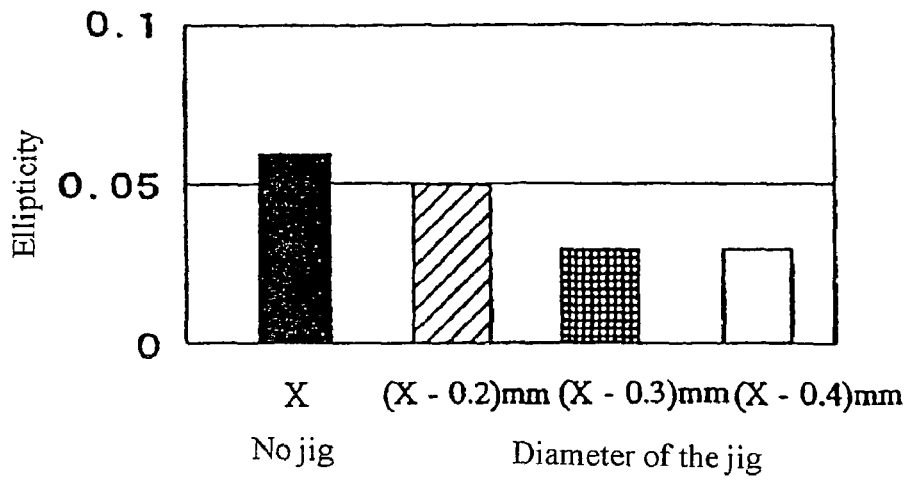
FIG. 6 is a graph illustrating the ellipticity of the outer peripheries of bead rings that are obtained when no jig is used, and when jigs having respective reduced inner diameter sections, whose inner diameters are different form each other, are used.
Figure 7:
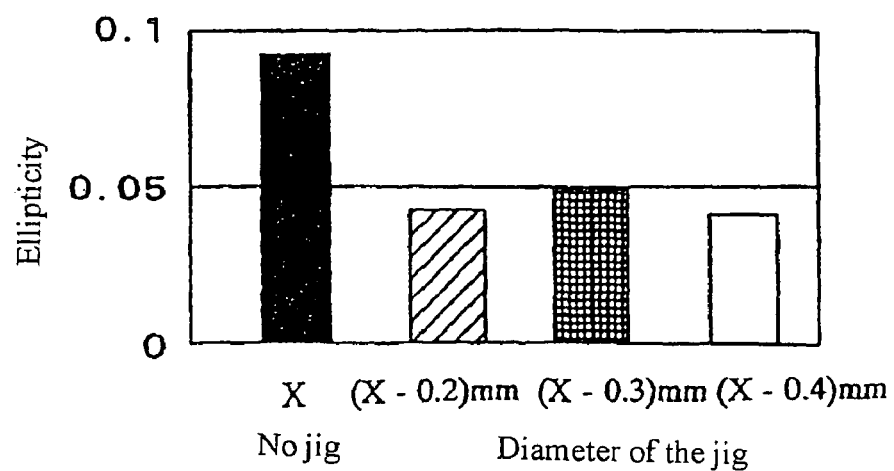
FIG. 7 is a graph illustrating the ellipticity below bead rings that are obtained when no jig is used, and when jigs having respective reduced inner diameter sections, whose inner diameters are different form each other, are used.

In each of the above described examples and the comparative example, an ellipticity (extent of ellipse) was observed. FIG. 6 shows the ellipticities at outer peripheries of the bead ring 6. FIG. 7 shows the ellipticities below the bead ring 6.

The "ellipticity" is a quotient of "the shortest axis of the bead ring 6 in a diametrical direction" divided by "the longest axis of the bead ring 6 in a diametrical direction". The smaller the ellipticity, the closer the bead ring 6 to a true circle, to prevent deformation.

As seen from FIG. 6, when the jig 13 was not used, the ellipticity of the bead ring 6 was 0.05 or more, which means a cross sectional shape of the bead ring 6 was ellipse. On the other hand, when the jigs 13 were used, the smaller the inner diameter of the reduced diameter section 15, the smaller the ellipticity of the squeezed bead ring 6. When the bead ring 6 was squeezed by the jig 13 having the reduced diameter section 15 of (X−0.4) mm, the ellipticity was 0.03. Thus, it was confirmed that the bead ring 6 became close to a true circle when it was squeezed, so as to prevent the deformation of the bead ring 6.

Similarly, as seen from FIG. 7, when the jig 13 was not used, the ellipticity below the bead ring 6 was about 0.08. On the other hand, when the bead ring 6 was squeezed by the jig 13 having the reduced diameter section 15 of (X−0.4) mm, the ellipticity was less than 0.05. This means that cross sectional shape of the bead ring 6 became a true circle, so as to prevent the deformation of the bead ring 6 by squeezing it by the reduced diameter section 15.

From the above described results, it is confirmed that, even if the leading edge 3a of the gas barrier material layer 3 is arranged close to the bead ring 6, the bead ring 6 is prevented from being deformed, and its diameter remains within the dimensional tolerable from the viewpoint of screwing the cap and the sealing effect of the bottle, by gradually cooling the heated neck 4 for 20 seconds, and then squeezing the bead ring 6 having the thermally deformable temperature for 5 seconds by the jig 13.

Substances that can suitably be used for the gas barrier material include resins having a gas barrier effect such as polyamide containing m-xylylenediamine (MXD-6: tradename) and ethylene/vinyl alcohol copolymers (EVOH) etc. Also, they may include an oxygen absorbing resin of an inorganic salt or an organic salt including a transition metal type catalyst (e.g., Co, Fe, Mn, Ni or Ti) in a matrix material of aliphatic nylon and aromatic nylon. Also, polyolefin oligomer may be included.

While the preform has a three-layered structure of PET-gas barrier material-PET (two different materials) in the above-described embodiment, the present invention is by no means limited thereto. According to the present invention, the preform may be a three-layered structure of PET blended with a gas barrier material-PET-PET blended with a gas barrier material. Alternatively, the preform may be a five-layered structure of PET-gas barrier material-PET (which may be a regenerated material)-gas barrier material-PET (two or three different materials). Additionally, while the primary molded product (preform) has a multilayer structure in the above-described embodiment, the present invention is also applicable to the primary molded product having a single layer structure, even if such a primary molded product has a difficulty of providing the neck with a proper profile due to the fluidity of resin at the time of injection molding.

As described above in detail, the present invention provides the following advantages.

With a method according to the invention, the bead ring of the neck of the primary molded product formed by injection molding is squeezed after the completion of heating, to prevent the bead ring from being deformed in order to reduce the outer diameter of the bead ring within the dimensional tolerance for deformation with regard to sealing effect. Thus, the neck of the primary molded product that is used for forming a bottle by biaxially-oriented blow molding can be processed reliable for thermal crystallization, and the cap can be screwed well onto the neck of the molded bottle.

Even if part of the leading edge of the gas barrier material layer is positioned above the neck ring, the outer diameter of the bead ring can be formed within the dimensional tolerance for deformation with regard to sealing effect without the deformation, by squeezing the bead ring.

When the bead ring is squeezed by 0.1 mm to 0.4 mm in terms of the outer diameter immediately after the completion of heating, it is possible to reduce the outer diameter of the bead ring and confine the deformation within the dimensional tolerance for deformation with regard to sealing effect, while maintaining the profile of the bead ring, that is held in a thermally deformable temperature zone, of the molded preform.

When the operation of squeezing the bead ring is started 10 seconds to 40 seconds after the completion of heating, the operation of squeezing the bead ring is started in a state where the bead ring is still held in a thermally deformable temperature zone after the completion of heating, and where it can be formed within the dimensional tolerance for deformation with regard to sealing effect.

In other words, when the operation of squeezing the bead ring is started 10 seconds to 40 seconds after the completion of heating, it is possible to reduce the deformation of the bead ring within the dimensional tolerance for deformation with regard to sealing effect.

When the bead ring is squeezed for 3-15 seconds, the squeezing operation can be arranged smoothly in the thermal crystallization process on the production line.

According to the present invention, since the bead ring having a thermally deformable temperature is squeezed by the jig of the present invention, the outer profile of the bead ring 6 is reliably prevented from being deformed, and the bead ring 6 dimensionally remains within a tolerable range from the viewpoint of the sealing effect of the bottle.

Since the hollow cylinder of the jig is provided with a tapered section, it can be smoothly engaged with the bead ring of the primary molded product, and smoothly removed from the primary molded product by supporting the neck of the preform by means of the piston rod.

When the jig is used for a primary molded product having a multilayer structure, the bead ring can be squeezed with maintaining its profile, by engaging the cylinder of the jig with the neck, said cylinder having an inner diameter smaller than the outer diameter of the bead ring.

The invention claimed is:

1. A method for thermally crystallizing a neck of a primary molded product for forming a bottle-shaped container made of polyethylene terephthalate as a principal ingredient, said neck having a functional part and a neck ring at a lower end thereof,
said functional part being formed with screw threads at an upper portion thereof and a bead ring below the screw threads,
said method comprising:
heating the neck, then
cooling the neck gradually,
contacting the bead ring of the neck with a jig configured to squeeze the bead ring in the cooling step, the neck being at a thermally deformable temperature, and
squeezing the bead ring inwardly with the jig in the cooling step,
wherein the method results in the bead ring having an outer diameter within a dimensional tolerance for deformation with regard to sealing effect,
wherein the jig has a piston rod; and
wherein the piston rod abuts an upper end of the neck and prevents the neck from being pulled up.

2. The method according to claim 1, wherein the primary molded product has a multilayer structure including at least one gas barrier material layer in a resin layer made of polyethylene terephthalate as a principal ingredient.

3. The method according to claim 1, wherein the bead ring is squeezed by 0.1 mm to 0.4 mm in terms of an outer diameter of the bead ring.

4. The method according to claim 1, wherein the neck is gradually cooled for 10 seconds to 40 seconds after heating.

5. The method according to claim 1, wherein the bead ring is squeezed for 3-15 seconds.

6. The method according to claim 2, wherein the bead ring is squeezed by 0.1 mm to 0.4 mm in terms of an outer diameter of the bead ring.

7. The method according to claim 2, wherein the neck is gradually cooled for 10 seconds to 40 seconds after heating.

8. The method according to claim 3, wherein the neck is gradually cooled for 10 seconds to 40 seconds after heating.

9. The method according to claim 2, wherein the bead ring is squeezed for 3-15 seconds.

10. The method according to claim 3, wherein the bead ring is squeezed for 3-15 seconds.

11. The method according to claim 4, wherein the bead ring is squeezed for 3-15 seconds.

* * * * *